US012645418B2

(12) United States Patent
Zeung

(10) Patent No.: US 12,645,418 B2
(45) Date of Patent: Jun. 2, 2026

(54) WIRELESS CONNECTION METHOD WHICH CAN SIMPLIFY SCREEN MIRRORING PROCEDURE

(71) Applicant: PixArt Imaging Inc., Hsin-Chu City (TW)

(72) Inventor: Ping-Shun Zeung, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 85 days.

(21) Appl. No.: 18/422,004

(22) Filed: Jan. 25, 2024

(65) Prior Publication Data
US 2025/0244942 A1      Jul. 31, 2025

(51) Int. Cl.
*G06F 3/14* (2006.01)
*H04N 7/15* (2006.01)

(52) U.S. Cl.
CPC ............. *G06F 3/1454* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 11,856,289 B1 * | 12/2023 | Bacon | ..................... | H04N 5/765 |
| 2010/0066677 A1 * | 3/2010 | Garrett | ..................... | G06F 1/169 |
| | | | | 345/173 |
| 2016/0048367 A1 * | 2/2016 | Chen | ..................... | G06F 3/1423 |
| | | | | 345/2.2 |
| 2016/0057316 A1 * | 2/2016 | Godfrey | ................ | G10L 21/013 |
| | | | | 704/207 |
| 2016/0350058 A1 * | 12/2016 | Zhu | ..................... | H04N 21/4126 |
| 2019/0182060 A1 * | 6/2019 | Simotas | .............. | H04L 61/4541 |
| 2019/0182300 A1 * | 6/2019 | Simotas | .............. | H04L 61/4511 |
| 2019/0318644 A1 * | 10/2019 | Aleem | ..................... | G06F 21/41 |
| 2021/0058584 A1 * | 2/2021 | Decamp | .............. | G06F 1/1632 |
| 2021/0373840 A1 * | 12/2021 | Morris | ..................... | G09G 5/14 |
| 2022/0083308 A1 * | 3/2022 | Morris | ..................... | G06F 21/84 |

* cited by examiner

*Primary Examiner* — Parul H Gupta
(74) *Attorney, Agent, or Firm* — Winston Hsu

(57) ABSTRACT

A wireless connection method, applied to a wireless communication system comprising a first host device, comprising: (a) detecting if a first dongle is plugged into a first device by the first dongle; (b) connecting the first dongle with the first host device, to establish a first wireless connection between the first device and the first host device; and (c) automatically receiving connection information of a second wireless connection from the first host device via the first wireless connection and automatically providing the connection information to the first device, by the first dongle. By using the disclosed methods, screen mirroring steps can be simplified and only dongles which have simple architectures are needed. Accordingly, the hardware cost can also be reduced.

12 Claims, 7 Drawing Sheets

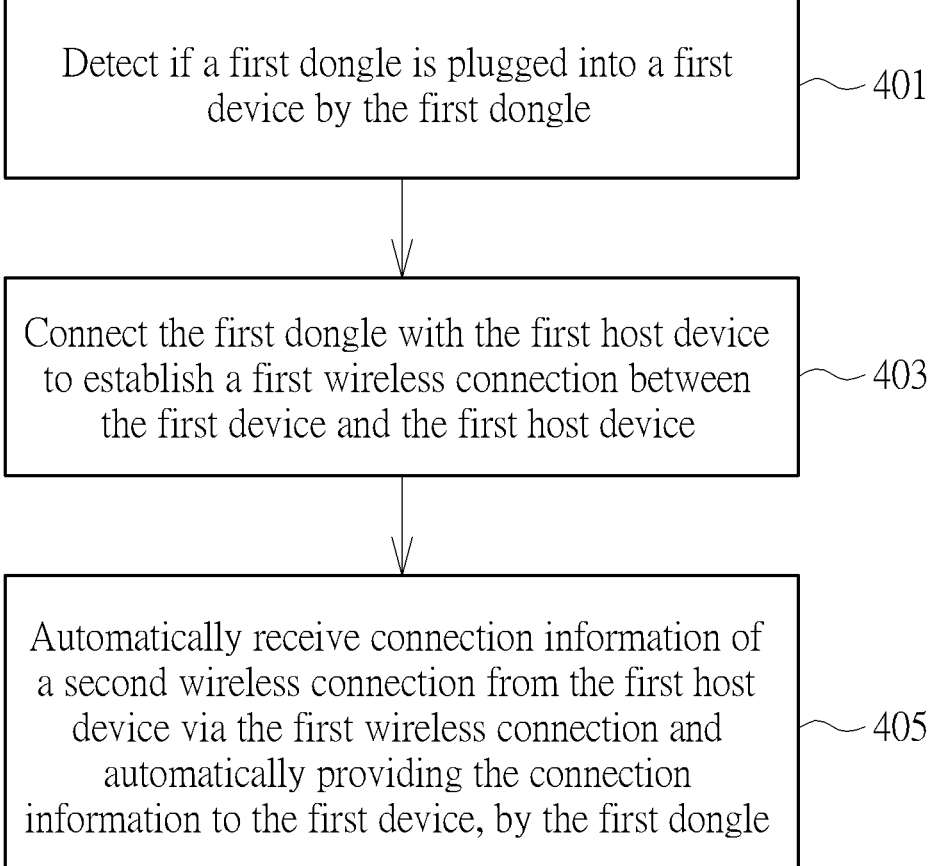

Detect if a first dongle is plugged into a first device by the first dongle ~401

Connect the first dongle with the first host device to establish a first wireless connection between the first device and the first host device ~403

Automatically receive connection information of a second wireless connection from the first host device via the first wireless connection and automatically providing the connection information to the first device, by the first dongle ~405

FIG. 4

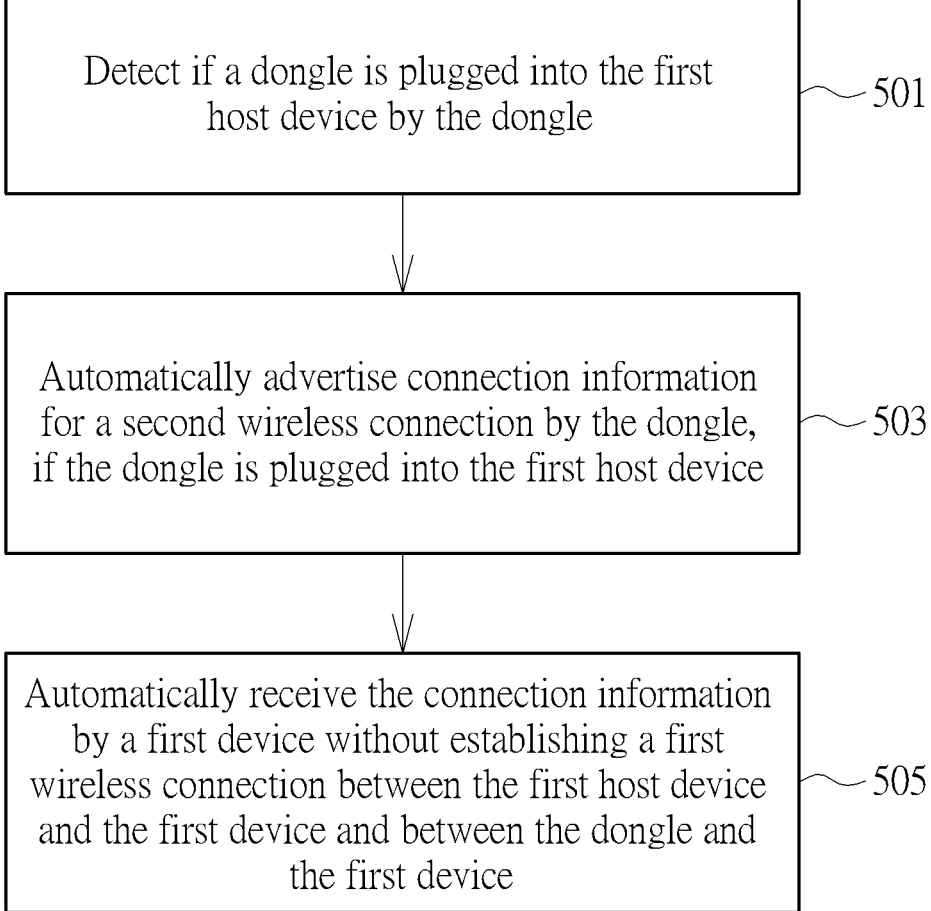

Detect if a dongle is plugged into the first host device by the dongle ~501

Automatically advertise connection information for a second wireless connection by the dongle, if the dongle is plugged into the first host device ~503

Automatically receive the connection information by a first device without establishing a first wireless connection between the first host device and the first device and between the dongle and the first device ~505

FIG. 5

WIRELESS CONNECTION METHOD WHICH CAN SIMPLIFY SCREEN MIRRORING PROCEDURE

BACKGROUND OF THE INVENTION

1. Field of the Invention

The present invention relates to a wireless connection method and particularly relates to a wireless connection method which can simplify a screen mirroring procedure.

2. Description of the Prior Art

With the advancement of the technology, a screen mirroring system becomes more and more popular. However, a conventional screen mirroring system always needs particularly designed devices, thus always have a high cost and functions thereof are limited. Alternatively, if the user wishes to use a normal computer or a normal mobile device as a screen sharing system, particular software such as remote meeting software is needed. In such case, the user needs to learn complicated steps for using the remote meeting software. Also, the screen mirroring function of the remote meeting software is always limited.

SUMMARY OF THE INVENTION

One objective of the present invention is to provide a wireless connection method which can simplify a screen mirroring procedure.

Another objective of the present invention is to provide a wireless connection method which can reduce a cost of a wireless communication system.

One embodiment of the present invention discloses a wireless connection method, applied to a wireless communication system comprising a first host device, comprising: (a) detecting if a first dongle is plugged into a first device by the first dongle; (b) connecting the first dongle with the first host device, to establish a first wireless connection between the first device and the first host device; and (c) automatically receiving connection information of a second wireless connection from the first host device via the first wireless connection and automatically providing the connection information to the first device, by the first dongle.

Another embodiment of the present invention discloses a wireless connection method, applied to a wireless communication system comprising a first host device, comprising: detecting if a dongle is plugged into the first host device by the dongle; automatically advertising connection information for a second wireless connection by the dongle, if the dongle is plugged into the first host device; and automatically receiving the connection information by a first device without establishing a first wireless connection between the first host device and the first device and between the dongle and the first device.

In view of above-mentioned embodiments, the screen mirroring steps can be simplified and only dongles which have simple architectures are needed. Accordingly, the hardware cost can also be reduced.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flow chart illustrating a wireless connection method according to one embodiment of the present invention.

FIG. 5 is a flow chart illustrating a wireless connection method according to another embodiment of the present invention.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. Additionally, the term "first", "second", "third" in following descriptions are only for the purpose of distinguishing different elements, and do not mean the sequence of the elements. For example, a first device and a second device only mean these devices can have the same structure but are different devices.

Figure 1:
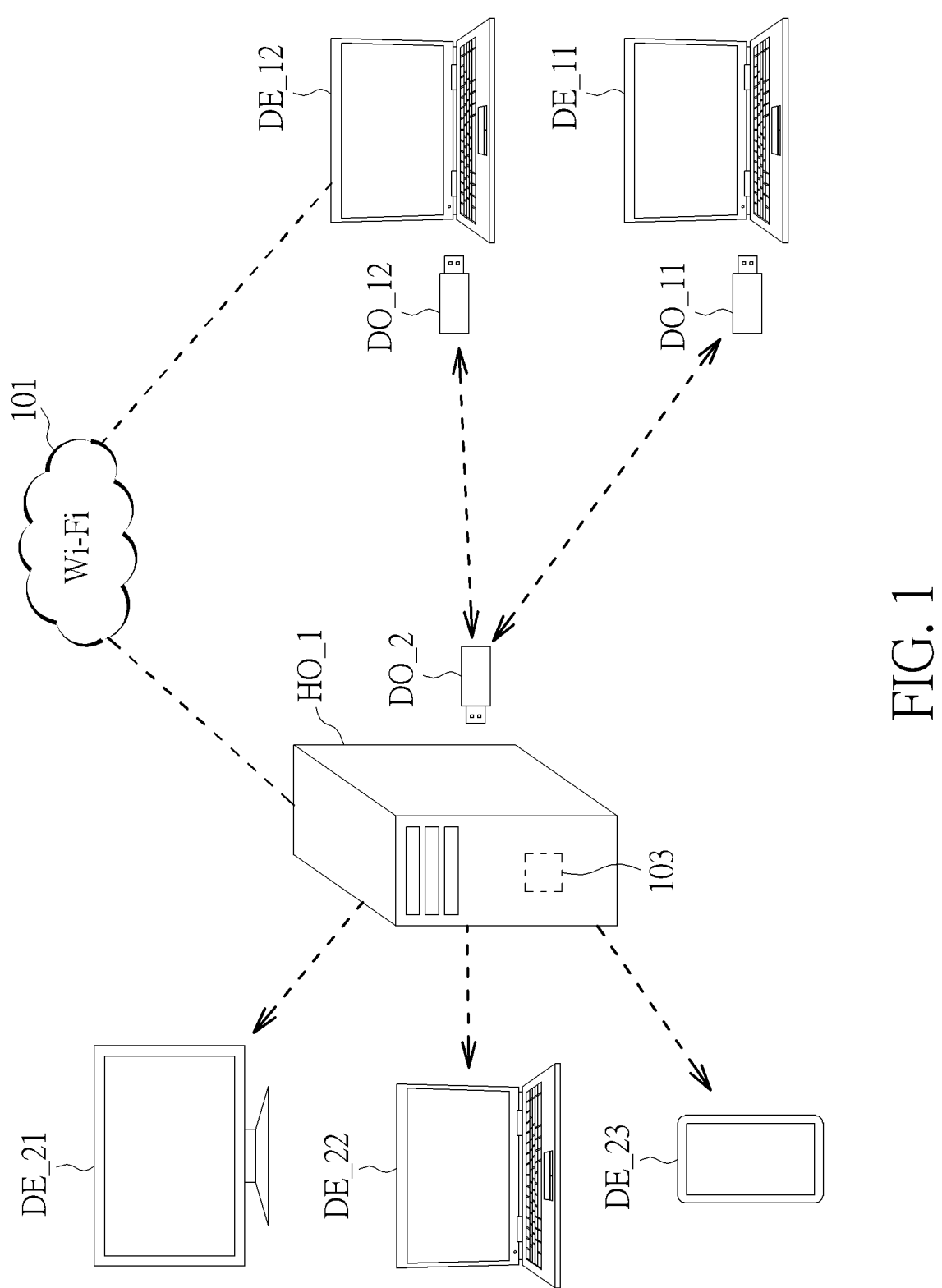
FIG. 1 is a schematic diagram illustrating a wireless connection method according to one embodiment of the present invention.

FIG. 1 is a schematic diagram illustrating a wireless connection method according to one embodiment of the present invention. As illustrated in FIG. 1, a wireless communication system comprising a first host device HO_1 and a first dongle DO_11 is provided. The first dongle DO_11 is a device which can store at least one program (e.g., an APP), and can automatically execute the program. For example, the first dongle DO_11 detects if itself is plugged into (i.e., connected to) a first device DE_11, and the first dongle DO_11 advertises reconnection information to connect the first dongle DO_11 and the first host device HO_1 (where the first dongle DO_11 and the first host device HO_1 are paired in advanced) if the first dongle DO_11 is plugged into the first device DE_11. On the contrary, the first dongle DO_11 does not advertise reconnection information if the first dongle DO_11 is not plugged into the first device DE_11.

Please note, the operation "the first dongle DO_11 is plugged into the first device DE_11" mentioned here means that the first dongle DO_11 is plugged into any electronic device, rather than limits the electronic device is a specific first device DE_11. In one embodiment, the first dongle DO_11 advertises reconnection information if a physical port thereof is plugged into a device which follows a predetermined standard or has a specific structure. For example, if the first dongle DO_11 comprises a USB port, the first dongle DO_11 advertises reconnection information if the USB port thereof is plugged into to another USB port. In one embodiment, the first device DE_11 is a laptop, but not limited. The first device DE_11 may be any other electronic device, such as a tablet computer or a mobile phone.

After that, the first device DE_11 is connected to the first host device HO_1 according to the reconnection information, to establish a first wireless connection between the first device DE_11 and the first host device HO_1. In one embodiment, the first host device HO_1 further comprises an authentication mechanism, to check if the first device DE_11 is an allowable device which connection information should be provided to. For example, the user of the first device DE_11 needs to provide a password after connects to the first host device HO_1, or the first device DE_11 could not acquire the connection information even if it has already connected to the first host device HO_1. The connection information is for a second wireless connection and details thereof will be described in following embodiments. By this way, malicious connection to the first host device HO_1 or to the second wireless connection maybe blocked.

Further, in one embodiment, the first host device HO_1 recording identification information of dongles, such as Bluetooth ID, and removes identification information of dongles which are unsuitable for receiving connection information or unsuitable for connecting to the first host device HO_1. For example, the first host device HO_1 records a Bluetooth ID of the first dongle DO_11, and sets the Bluetooth ID in an allowable list. If the Bluetooth ID of the first dongle DO_11 is in the allowable list, the first dongle DO_11 is allowed to connect with the first host device HO_1 and/or receives connection information. If the first dongle DO_11 is lost, the user may remove the Bluetooth ID of the first dongle DO_11 from the allowable list, thus the first dongle DO_11 could not connect with the first host device HO_1 and/or could not receive connection information. By this way, even if the lost first dongle DO_11 is found by a person who has no right to use the first host device HO_1 or the second wireless connection, he could not use the first host device HO_1 via the first dongle DO_11, thus security of the wireless communication system may be ensured.

The first wireless connection may be any wireless connection, for example, Proprietary Radio Frequency connection or Bluetooth connection. In one embodiment, the first wireless connection is established by the first dongle DO_11, and by a first wireless communication device 103 located in the first host device HO_1. For example, if the first wireless connection is a Bluetooth connection, the first wireless communication device 103 is a Bluetooth device, and the first dongle DO_11 also provides Bluetooth function. In another embodiment, the wireless communication system further comprises a second dongle DO_2, which is plugged into the first host device HO_1. In such case, the first dongle DO_11 is used as a slave communication device for the first wireless connection, and the second dongle DO_2 connected to the first host device HO_1 is used as a master device for the first wireless connection. For example, the first wireless connection could be based on proprietary RF protocol. Or, if the first wireless connection is a Bluetooth connection, the second dongle DO_2 is served as a BLE central, and the first dongle DO_11 is served as a BLE peripheral. In one embodiment, the type of wireless connection may be automatically selected according to a type of the first device DE_11. For example, the Bluetooth connection is used if the first device DE_11 is a mobile phone, and the Proprietary Radio Frequency connection is used if the first device DE_11 is a laptop.

In one embodiment, the first dongle DO_11 has already been paired with the second dongle DO_2 in advance. For example, the first dongle DO_11 has been paired with the second dongle DO_2 in the manufacturing factory or by a client who buy it. In such case, the first dongle DO_11 advertises reconnection information to connect the first dongle DO_11 and the second dongle DO_2 if the first dongle DO_11 is plugged into the first device DE_11.

After the first wireless connection has been built, the first dongle DO_11 automatically receives the above-mentioned connection information of the second wireless connection from the first host device HO_1 via the first wireless connection and automatically provides the connection information to the first device DE_11. The second wireless connection may be a wireless connection provided by the first host device HO_1, such as Wi-Fi provided by the first host device HO_1. In such example, the first host device HO_1 may be a simulated router of Wi-Fi. Also, the second wireless connection may be a wireless connection independent from the first host device HO_1. For example, the first host device HO_1 is a computer in a meeting room, and the second wireless connection is Wi-Fi 101 provided by an AP (wireless accessing point) in the meeting room.

After the connection information is received by the first device DE_11, the first device DE_11 is connected to the second wireless connection via the connection information. The connection information can be information which is needed to use the second wireless connection, such as an account, a password, an IP address, and a type of communication protocol. In the example that the second wireless connection is Wi-Fi, the connection information may be Wi-Fi profile. After the first device DE_11 is connected to the second wireless connection, a screen of the first device DE_11 may be mirrored to a second device by the first host device HO_1 via the second wireless connection. Please note the step of "mirror the screen" may indicate mirror the contents which the first device is playing in real time, or the contents which is selected by a user. For example, if the first device is playing a video and the step of "mirroring a screen" is triggered, the second device which receives the mirrored screen also plays the video. For another example, if the step of "mirroring a screen" is triggered, a user of the first device may select a document stored in the first device and mirroring the document to a second device.

The second device may be various electronic devices and the number thereof is not limited to 1. For example, in the embodiment of FIG. 1, the second devices DE_21, DE_22, and DE_23 are respectively a display, a laptop, and a mobile phone. The second devices DE_21, DE_22, and DE_23 may be in the same place, for example, in a meeting room in which the first device DE_11 and the first host device HO_1 are also located. In such case, the second devices DE_21, DE_22, and DE_23 may connect to the first host device HO_1 via a wired connection or a wireless connection. However, the second devices DE_21, DE_22, and DE_23 may be located in at least two different buildings, cities, or countries. For example, the second devices DE_21, DE_22 is located in USA, and the second device DE_23 is located in European. In such case, the second devices DE_21, DE_22, and DE_23 may connect to the first host device HO_1 via a wireless connection, such as World Wide Web network.

It will be appreciated the number of the first device may be more than one. For example, as shown in FIG. 1, another first device DE_12 is also provided. In such case, each one of the first devices DE_11 and DE_12 may follow the above-mentioned steps to mirror screens thereof to the at least one second device. However, one of the first devices may mirror a screen thereof to another one of the first devices. For example, in the embodiment of FIG. 1, the screen of the first device DE_11 may be mirrored to the first device DE_12. Such step can also be regarded as mirroring the screen of a first device to a third electronic device different from the first device and the second electronic device.

The above-mentioned steps may be performed via executing an APP in the first dongle DO_11 or via executing an APP installed in the first device DE_11. In one embodiment, when the first dongle DO_11 is plugged into the first device DE_11, the first dongle DO_11 may automatically execute an APP stored therein or install the APP to the first device DE_11, such that the first device DE_11 can perform the steps of FIG. 1 which are related with the first device DE_11. In another embodiment, a user of the first device DE_11 may manually execute an APP stored in the first dongle DO 1 or manually installs the APP to the first device DE_11, such that the first device DE_11 can perform the steps of FIG. 1 which are related with the first device DE_11.

Figure 2A:
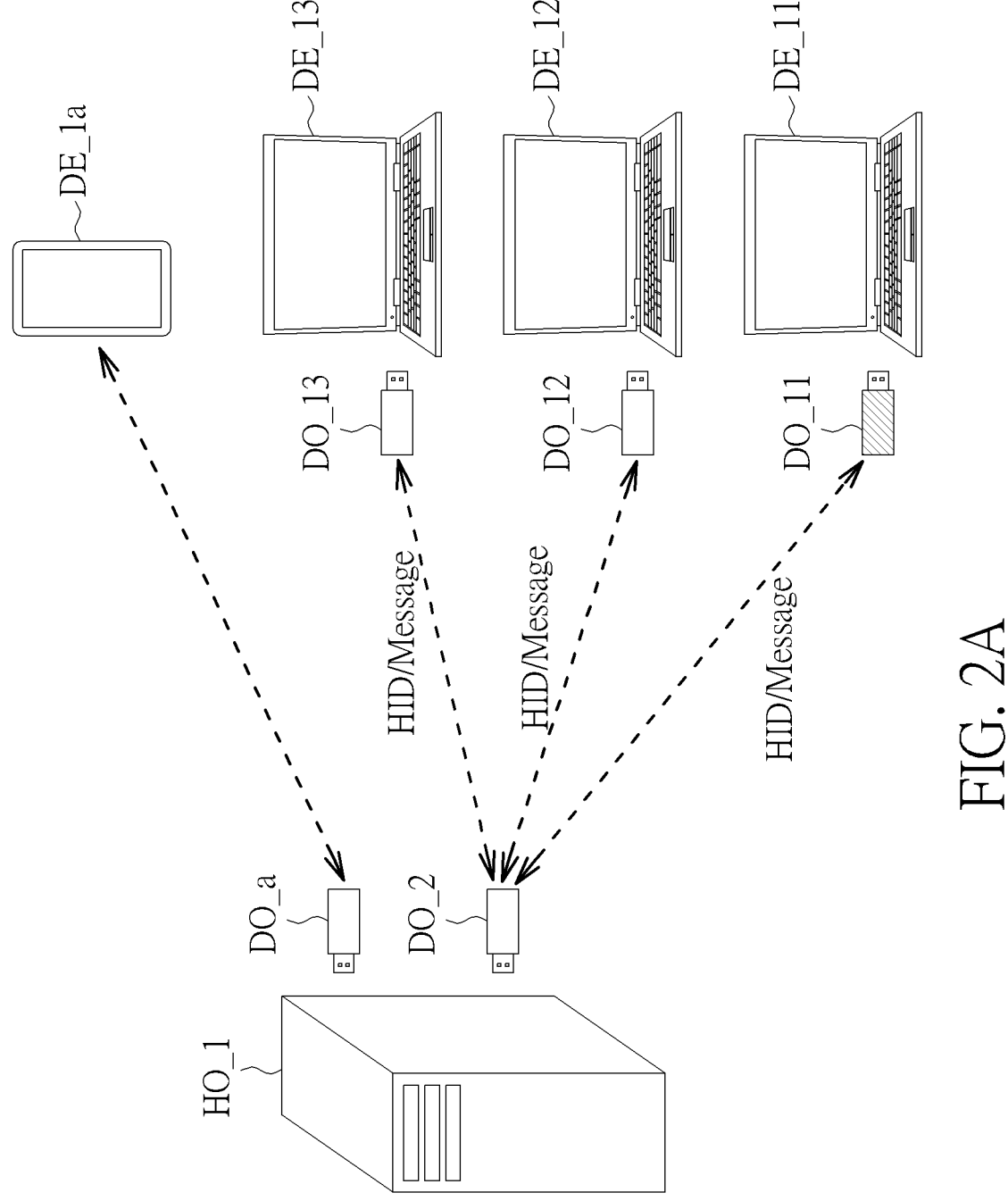
FIG. 2A is a schematic diagram illustrating a wireless connection method according to another embodiment of the present invention.

Besides the mechanism illustrated in FIG. 1, the present invention further provides other mechanisms. FIG. 2A is a schematic diagram illustrating a wireless connection method according to another embodiment of the present invention. Please note, for the convenience of explaining, some components illustrated in FIG. 1 are not illustrated in FIG. 2A. As show in FIG. 2A, besides the first devices DE_11, DE_12, the first dongles DO_11, DO_12, and the second dongle DO_2 shown in FIG. 1, the wireless communication system further comprises a first device DE_13, a first dongle DO 13, a dongle DO_a and a first device DE_1a. In one embodiment, the dongle DO_a and the second dongle DO_2 may be combined to a single dongle.

In the embodiment of FIG. 2A, the dongle DO_a detects if itself is plugged into the first host device HO_1. For example, the dongle DO_a detects if itself is plugged into any electronic device. If the dongle DO_a is plugged into the first host device HO_1, the dongle DO_a automatically advertises connection information for a second wireless connection. The first device DE_1a automatically receives the connection information without establishing a first wireless connection between the first host device HO_1 and the first device DE_1a and without establishing the first wireless connection between the dongle DO_a and the first device DE_1a. In the embodiment of FIG. 2A, the first device DE_1a is a mobile phone, but it can be other electronic devices such as a tablet compute or a laptop. If the first device DE_1a is a mobile phone or a tablet computer, the first device DE_1a may scan a QR code to install an APP, such that the first device DE_1a can perform the steps of FIG. 2A which are related with the first device DE_1a.

The second wireless connection may be a wireless connection provided by the first host device HO_1, such as Wi-Fi provided by the first host device HO_1. Also, the second wireless connection may be a wireless connection independent from the first host device HO_1. For example, the first host device HO_1 is a computer in a meeting room, and the second wireless connection is Wi-Fi 101 in FIG. 1, which is provided by an AP (wireless accessing point) in the meeting room. Afterwards, a screen of the first device DE_11 is mirrored to a second device by the first host device HO_1 via the second wireless connection. In the example that the second wireless connection is Wi-Fi, the connection information may be Wi-Fi profile.

After the first device DE_1a receives the connection information, the first device DE_1a may mirror a screen thereof to a second device via the second wireless connection. Details of the second device has been illustrated in above-mentioned descriptions of FIG. 1, thus are omitted here for brevity.

In the embodiment of FIG. 1, the operations of the first device may be controlled by the first host device HO_1 or the first device itself. For example, after the first device DE_11 is connected to the first host device HO_1 via the second wireless connection, "screen mirroring" of the first device DE_11 may be controlled by the first host device HO_1. For example, the user may use a mouse which is already connected to the first host device HO_1 by a wired connection or a wireless connection to control the first device DE_11 via the first host device HO_1. For another example, after the first device DE_11 is connected to the first host device HO_1 via the second wireless connection, the user may use a mouse which is already connected to the first device DE_11 by a wired connection or a wireless connection to control the first device DE_11. However, the operations of one first device may be controlled by another first device, such as the following embodiment shown in FIG. 2A. In the following embodiment, the first device DE_12 or the first device DE_13 may be controlled by the first device DE_11.

In the embodiment of FIG. 2A, the first dongle DO_11 comprises a management APP. The management APP may be an APP independent from the above-mentioned APP for mirroring steps or incorporated into the APP. In such case, the above-mentioned connection information is provided to a third device (e.g., the first device DE_12 or the first device DE_13 in FIG. 2A) such that the third device is wirelessly connected to the first host device HO_1 via the second wireless connection via above-mentioned steps. Also, the first device DE_11 is set as a management device via the management APP. Then, the operations of the third device can be controlled by the first device DE_11. In this case, the first device DE_11 may also control the first host device HO_1.

The operations mentioned here may be all operations or a portion of the operations that the third device can perform, for example, selecting the data which is mirrored to the second device, rebooting or turning off. In one embodiment, the first device DE_11 is directly served as the management device to control the operations of the third device. For example, a user may use the first device DE_11 to control the third device. In another embodiment, the first device DE_11 is indirectly served as the management device to control the operations of the third device. For example, a user can control the first host device HO_1 via the first device DE_11, thereby the operations of the third device may be controlled via the first host device HO_1.

Such mechanism may be regarded as bi-directional control. For more detail, the data may be categorized into messages and HID stream. A host device may provide HID stream to the client device, but the client device only provides messages to the control device. Conventional devices always use a single directional control. For example, a conventional mouse may output a command to a corresponding dongle, but the corresponding dongle could not output a command to the mouse. For another example, a conventional mouse may output commands to corresponding dongles, but the corresponding dongles could not output a command to the mouse. For still another example, a plurality of keyboards and mice share the same dongle. The keyboards and mice can transmit commands to the dongle but the dongle could not transmit commands to the keyboards and mice. However, in the present invention, each of the first host device HO_1 and first devices DE_11, DE_12 and DE_13 may operate as a control device to control other devices. Accordingly, the transmission of the messages and HID stream may be bi-directional, as shown in FIG. 2A.

Such mechanism may be applied for different applications. For example, if the bi-directional control is applied to a KVM switch system, the first host device HO_1 may transmit messages and HID streams to a first device which is controlled. In such case, the first host device HO_1 only transmits messages to the first device which is not controlled by the first host device HO_1. For example, the first host device HO_1 is used for controlling the first device DE_12 thus transmits messages and HID streams to the first device DE_12, but only transmits messages to the first devices DE_11 and DE_13. Following the same manner, if the first host device HO_1 is switched for controlling the first device DE_13, the first host device HO_1 transmits messages and HID stream to the first device DE_13, but only transmits messages to the first devices DE_11 and DE_12. Further, in the embodiment of FIG. 2A, the first device DE_12 and DE_13 which are not controlled by the first host device HO_1 only transmit messages but do not transmit HID streams to the first host device HO_1.

For another example, if the bi-directional control is applied to a meeting room, the first device DE_12 may operate as a control device to control the first host device HO_1. In such case, the first device DE_12 transmits messages and HID streams to the first host device HO_1, but the first devices DE_11 and DE_13 only transmit messages to the first host device HO_1.

Figure 2B:
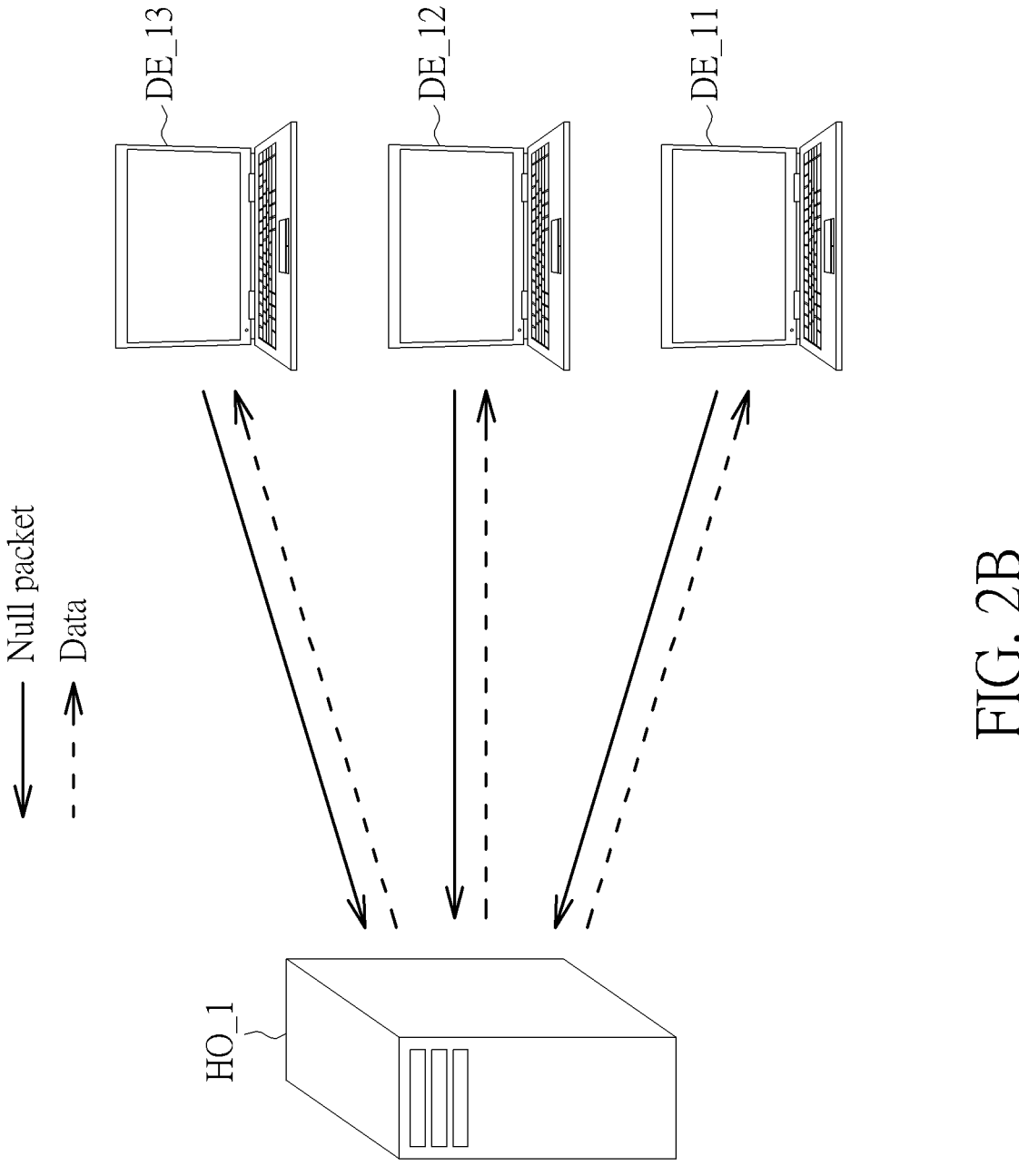
FIG. 2B and FIG. 2C are schematic diagrams illustrating data flow control mechanisms for the bi-direction control illustrated in FIG. 2A.
Figure 2C:
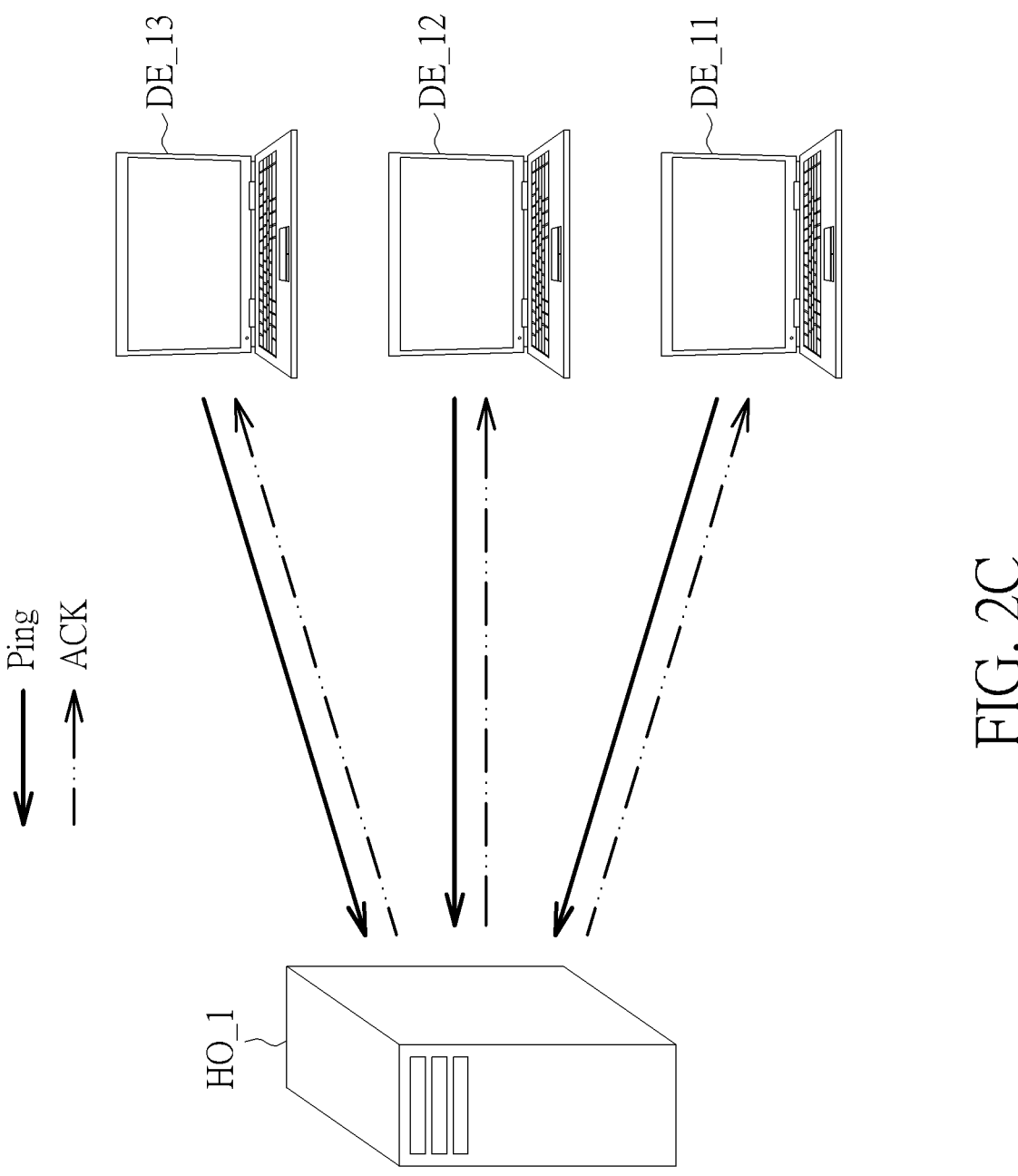

In order to prevent data lost in bi-directional control, a data flow control mechanism is also provided. FIG. 2B and FIG. 2C are schematic diagrams illustrating a data flow control mechanism for the bi-direction control illustrated in FIG. 2A. Please note, although the embodiments in FIG. 2B and FIG. 2C are illustrated by the first host device HO_1 and first devices DE_11, DE_12 and DE_13, the operations illustrated in FIG. 2B and FIG. 2C may be performed by dongles if the first devices DE_11, DE_12 and DE_13 are connected to the first host device HO_1 by dongles.

In the embodiment of FIG. 2B, on low level (e.g., physic layers or connection levels), the client device always sends null packets, and the control device will ack the null packets if there is data to be send to client device. In order to prevent control device from losing client data due to the host device get null packets from different client devices at the same time, the null packet frequencies (i.e., generation rates of the null packets) of different client devices are all different according to client number (e.g., client ID), to lower the data collision rate. In one embodiment, in order to send keyboard and mouse report, the null packet frequencies may be increased to insure the report rate.

Further, in the embodiment of FIG. 2C, on protocol level (e.g., a high level or a data transmission level), the client device will send ping packets to the host in a high frequency (e.g., 150 ms one time), and the control device will ack (sending ack packets) the ping to check if the client device or the host is there or not. If there is data to be transmitted, the aforementioned transferring of the ping packets and ack packets is replaced with data transmission.

Figure 3:
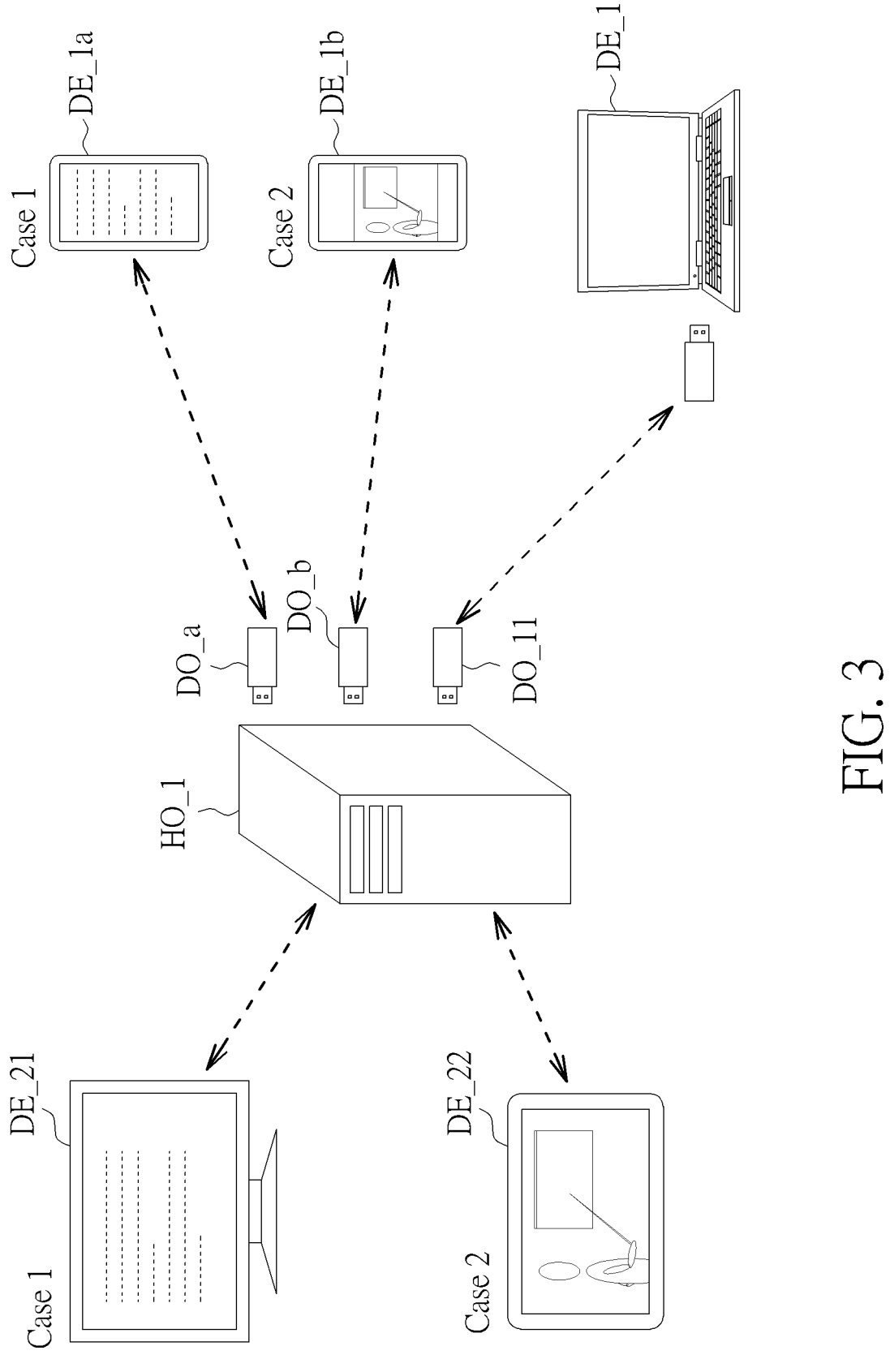
FIG. 3 is a schematic diagram illustrating a wireless connection method according to still another embodiment of the present invention.

Besides mirroring the screen which is selected or being displayed on the first device to the second electronic device, the first device may operate as a virtual camera of the first control device. FIG. 3 is a schematic diagram illustrating a wireless connection method according to another embodiment of the present invention. As show in FIG. 3, besides the first device DE_11, the first dongle DO_11 and the first host device HO_1 shown in FIG. 1, the wireless communication system further comprises dongles DO_a, DO_b and first devices DE_1a, DE_1b.

In the embodiment of FIG. 3, the first device DE_11 may execute a meeting program such that the first devices DE_11, DE_1a and DE_1b can join a conference generated by the meeting program. In such case, the virtual camera functions of the conference may be triggered by the first device DE_11 if the first device DE_11 has the right of controlling the conference. In such case, the first device DE_11 may select at least one of the first devices DE_1a and DE_1b as the virtual camera content source, the first device which serves as the virtual camera can mirror a screen thereof or mirror the images sensed by a camera thereof to the second device. For example, if the first device DE_1a is selected as a virtual camera and is displaying a document (case 1), the document is mirrored to the second device DE_21. Such step is the same as the above-mentioned mirroring steps. For another example, if the first device DE_1b is selected as a virtual camera and is using a camera (case 2), thus the first device DE_1b mirrors images captured by the camera thereof to the second device DE_22 in real time responding to the triggering of the virtual camera function.

Please note, the first device which selects the virtual camera and the first device which is served as the virtual camera may be identical. For example, the first device DE_11 may select itself as a virtual camera. Additionally, the virtual camera function is not limited to be provided by the meeting program. The virtual camera function may be provided by the APP which is executed by or installed to the first device. Additionally, the virtual camera function may be provided by the above-mentioned management APP.

In view of above-mentioned embodiment in FIG. 1, a wireless connection method can be acquired, which comprises the steps shown in FIG. 4:

Step 401

Detect if a first dongle (e.g., the first dongle DO_11 in FIG. 1) is plugged into a first device (e.g., the first device DE_11 in FIG. 1) by the first dongle.

In one embodiment, the first dongle advertises pairing information if the first dongle is plugged into the first device.

Step 403

Connect the first dongle with the first host device, to establish a first wireless connection (e.g., Bluetooth or RF) between the first device and the first host device.

Step 405

Automatically receive connection information of a second wireless connection (e.g., WiFi) from the first host device via the first wireless connection and automatically providing the connection information to the first device, by the first dongle.

In view of above-mentioned embodiment in FIG. 2A, a wireless connection method can be acquired, which comprises the steps shown in FIG. 5:

Step 501

Detecting if a dongle (e.g., the dongle DO_a in FIG. 2A) is plugged into the first host device (e.g., the first host device HO_1 in FIG. 2A) by the dongle.

Step 503

Automatically advertise connection information for a second wireless connection by the dongle, if the dongle is plugged into the first host device.

Step 505

Automatically receive the connection information by a first device (e.g., the first device DE_1a in FIG. 2A) without establishing a first wireless connection between the first host device and the first device and between the dongle and the first device.

Other detail steps of the wireless connection methods illustrated in FIG. 4 and FIG. 5 can be acquired according to above-mentioned embodiments, thus are omitted here for brevity. Further, in above-mentioned embodiments, the wireless communication system and the wireless connection method are used for mirroring a screen. However, the wireless communication system and the wireless connection method provided by the present invention may be used for other applications.

In view of above-mentioned embodiments, the screen mirroring steps can be simplified and only dongles which have simple architectures are needed. Accordingly, the hardware cost can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless connection method, applied to a wireless communication system comprising a first host device, comprising:

(a) detecting if a first dongle is plugged into a first device by the first dongle;

(b) connecting the first dongle with the first host device, to establish a first wireless connection between the first device and the first host device;

(c) automatically receiving connection information of a second wireless connection from the first host device via the first wireless connection and automatically providing the connection information to the first device, by the first dongle; and (d) connecting the first device to the first host device via the second wireless connection but not via the first dongle and the first wireless connection, after the first device acquiring the connection information of the second wireless connection.

2. The wireless connection method of claim 1, further comprising:

performing an authentication mechanism by the first host device to check if the first device is an allowable device which can receive the connection information.

3. The wireless connection method of claim 1, further comprising:

checking if identification information of the first dongle is recorded in an allowable list by the first host device;

wherein the step (b) does not connect the first dongle with the first host device if the identification information is not recorded in an allowable list; or wherein the step (c) does not provide the connection information to the first dongle if the identification information is not recorded in an allowable list.

4. The wireless connection method of claim 1, further comprising:

mirroring a screen of the first device to a second device by the first host device via the second wireless connection.

5. The wireless connection method of claim 1, wherein the first wireless connection is established by a first wireless communication device located in the first host device and the first dongle.

6. The wireless connection method of claim 1, further comprising:

using the first dongle as a slave communication device for the first wireless connection; and using a second dongle connected to the first host device as a master device for the first wireless connection.

7. The wireless connection method of claim 1, wherein the first device is a laptop.

8. The wireless connection method of claim 1, wherein the first dongle comprising a management APP, the wireless connection method further comprising:

providing the connection information to a third device such that the third device is wirelessly connected to the first host device via the second wireless connection;

setting the first device as a management device via the management APP; and controlling operations of the third device or the first host device by the first device.

9. The wireless connection method of claim 1, further comprising:

executing a meeting program by the first device such that the first device joins a conference generated by the meeting program;

triggering a virtual camera function of the conference by the first device; and mirroring images captured by a camera of the first device to the second device in real time responding to the triggering of the virtual camera function, via the second wireless connection.

10. The wireless connection method of claim 1, further comprising:

providing the connection information to a third device such that the third device is wirelessly connected to the first host device via the second wireless connection; and mirroring a screen of the first device to the third device via the second wireless connection.

11. The wireless connection method of claim 1, further comprising:

connecting a plurality of first devices to the first host device by the second wireless connection, wherein one of the first devices and the first host device is served as a control device and other ones of the first devices and the first host are served as client devices; and transmitting null packets to the control device by the client devices;

wherein different ones of the client device have different null packet frequencies.

12. The wireless connection method of claim 1, further comprising:

connecting a plurality of first devices to the first host device by the second wireless connection, wherein one of the first devices and the first host device is served as a control device and other ones of the first devices and the first host are served as client devices;

sending ping packets to the control device by the client devices;

acking the pings via ack packets by the control device; and replacing the transferring of the ping packets and ack packets with data transmission when there is data to be transmitted.

\* \* \* \* \*